United States Patent

Clemons Van Gaalen et al.

[11] Patent Number: 5,869,191
[45] Date of Patent: Feb. 9, 1999

[54] ACID FUNCTIONAL AND EPOXY FUNCTIONAL POLYSTER RESINS

[75] Inventors: Ronald Petrus Clemons Van Gaalen; Petrus Gerardus Kooijmans; Eric Johannes Vos, all of CM Amsterdam, Netherlands

[73] Assignee: Shell Oil Company, Houston, Tex.

[21] Appl. No.: 977,011

[22] Filed: Nov. 24, 1997

[30] Foreign Application Priority Data

Nov. 25, 1996 [EP] European Pat. Off. ............ 96203304

[51] Int. Cl.⁶ .............................. B32B 27/06; C08F 20/00
[52] U.S. Cl. .................... 428/482; 528/295.3; 528/297; 528/300; 528/302; 528/303; 528/304; 528/307; 525/437; 525/438; 525/445; 522/6; 522/71; 522/165; 522/178
[58] Field of Search .................... 528/295.3, 297, 528/300, 302, 303, 304, 307; 525/437, 438, 445; 522/6, 71, 165, 178; 428/482

[56] References Cited

U.S. PATENT DOCUMENTS

| | | | |
|---|---|---|---|
| 3,988,288 | 10/1976 | Yamauchi et al. | 523/436 |
| 4,769,400 | 9/1988 | Geist et al. | 523/408 |
| 4,804,581 | 2/1989 | Geary et al. | 428/332 |
| 5,138,078 | 8/1992 | Brytus . | |
| 5,330,627 | 7/1994 | Grutter et al. | 204/181.4 |
| 5,336,753 | 8/1994 | Jung et al. | 528/335 |
| 5,728,779 | 3/1998 | Van De Werff et al. | 525/438 |
| 5,756,221 | 5/1998 | Horibe et al. | 428/626 |
| 5,759,694 | 6/1998 | Mayo et al. | 428/423.1 |

FOREIGN PATENT DOCUMENTS

| | | |
|---|---|---|
| 0477360 | 9/1991 | European Pat. Off. . |
| 0634434 | 1/1995 | European Pat. Off. . |
| 0720997 | 7/1996 | European Pat. Off. . |

*Primary Examiner*—Samuel A. Acquah

[57] ABSTRACT

Linear, tertiary carboxyl functional polyester resins obtainable by reaction of a) at least one compound $A_1$, comprising the reaction product of
  (i) a glycidylester of a mixture of certain highly branched saturated monocarboxylic acids isomers, and
  (ii) a mixture of said highly branched saturated monocarboxylic acids;
b) at least one aromatic or cycloaliphatic dicarboxylic acid compound B;
c) optionally at least one dihydroxymonocarboxylic acid compound C; and
d) optionally at least one diol compound D; in a certain molar ratio of compounds $A_1$:B:C:D, at a temperature of from 100° to 225° C., until essentially all the non-tertiary carboxyl groups as initially present in the reaction mixture have been reacted.

14 Claims, No Drawings

ACID FUNCTIONAL AND EPOXY FUNCTIONAL POLYSTER RESINS

The present invention relates to linear, tertiary carboxyl functional polyester resins, to a process for the preparation of the resins, to polyglycidylester resins obtainable by glycidating said linear, tertiary carboxyl functional polyester resins, to coating compositions, and in particular powder coating compositions or liquid coating compositions comprising said linear, tertiary carboxyl functional polyester resins or said polyglycidylester resins and to cured products obtained by using the indicated coating compositions.

Powder coating compositions based on the solid reaction products of 2,2-bis-(4-hydroxyphenyl)propane and epichlorohydrin are known. The cured products prepared on the basis of these compositions are resistant against hydrolysis. However, they show a low ultraviolet resistance and are therefore not suitable for applications requiring a high degree of outdoor durability such as building parts or automotive topcoats.

Triglycidylesters which can be used in good quality outdoor durable coatings and in moulding compositions are disclosed in European Patent Application No. 447360 (EP-A447,360). Due to the secondary nature of the terminal carboxyl functions present in the tricarboxylic acid adduct precursors, strong alkaline conditions should be avoided during glycidation of these tricarboxylic acid adducts to avoid hydrolysis of the glycidylester formed and/or hydrolysis of one or more ester groups in the resin backbone. As a result thereof the triglycidylester produced will contain a relatively high level of hydrolizable chlorine and/or will contain low molecular weight hydrolysis products which might cause toxicity problems.

The high level of hydrolizable chlorine is reflected in example 2 of EP-A-447,360 which relates to the glycidation of the 2:1 adduct of hexahydrophthalic anhydride and dimethylolpropionic acid. The product obtained has a chlorine content of 1.5%. Such a high level of residual chlorine is generally undesirable in coating compositions. In addition, due to the fact that the triglycidylesters reported in EP-A447,360 are liquid, they can not be applied in powder coating compositions.

The most commonly used system for outdoor durable powder coatings are polyester/triglycidylisocyanurate (TGIC). For health and safety reasons however the use of TGIC is viewed with suspicion. TGIC is relatively toxic (Rat Oral $LD_{50}$ of 0.4 g/kg) and there are indications that the compound is mutagenic according to the Ames Mutagenicity Test.

On the other hand CARDURA glycidylesters of highly branched carboxylic acids, having from 5 to 13 carbon atoms (CARDURA is a trademark), were known which could easily be prepared and reacted, but which still were monofunctional reagents.

From European patent application No. 0634434 was known a process for the preparation of linear tertiary aliphatic carboxyl functional polyester resins, by reacting:

(a) at least one compound A' comprising one monofunctional primary- or secondary hydroxyl group and/or at least one compound A" comprising one primary- or secondary hydroxyl group and one tertiary aliphatic carboxyl group;

(b) at least one aromatic or cycloaliphatic dicarboxylic acid compound B comprising two aromatic- or secondary aliphatic carboxyl groups or the anhydride thereof;

(c) at least one diol compound C comprising two aliphatic hydroxyl groups, which may independently be a primary or a secondary hydroxyl group; and (d) at least one dihydroxymonocarboxylic acid compound D comprising a tertiary aliphatic carboxyl group and two aliphatic hydroxyl groups, which may each independently be primary or secondary hydroxyl, the molar ratio of compounds A':A":B:C:D being

M:N:X+Y+1:X:Y wherein M+N=2, X ranges from 2 to 8 and Y ranges from 2-N to 8, at a temperature of from 100° to 240° C., until essentially all the non-tertiary carboxyl groups as initially present in the reaction mixture have been reacted.

Polyglycidylester resins were obtained by reacting such linear tertiary aliphatic carboxyl functional polyesters with an excess epihalohydrin in the presence of a suitable base and catalyst. Preferably, the polyesters were reacted with epichlorohydrin. Both the specified linear polyesters and the corresponding polyglycidylesters derived therefrom were used with a cross-linking agent for powder coating compositions.

From the European patent application No. 0720997, linear tertiary carboxyl functional polyesters and epoxy functional polyester resins were known. These polyester resins were obtainable by reaction of:

a) at least one aromatic and/or cycloaliphatic carboxylic acid compound A comprising two aromatic- and/or secondary aliphatic carboxyl groups or the anhydride thereof, b) at least one hydroxyl compound B comprising two aliphatic hydroxyl groups, which groups each independently may be primary or secondary hydroxyl groups, c) at least one hydroxyl substituted carboxylic acid compound C comprising at least one tertiary aliphatic carboxyl group and two aliphatic hydroxyl groups, which groups each independently may be primary or secondary hydroxyl groups, and d) optionally one carboxylic acid compound D comprising one carboxyl group, the molar ratio of compounds A:B:C:D being (X+Y-1):X:Y:Z, wherein X ranges from 2 to 8, Y ranges from 2 to 8, and Z ranges from 0 to 2.

These polyester resins could be used together with a suitable curing agent for the production of powder coatings, or could be converted into the corresponding glycidylesters, which in combination with a suitable curing agent could be used for the production of powder coatings.

Although the linear tertiary aliphatic carboxyl functional polyester resins and the polyglycidylesters thereof enabled a certain progress as to the requirements of excellent outdoor durability (UV stability) and resistance against hydrolysis in the cured state, with reference to their use in modern economically applied powder coatings, there is still a need for further improvement of this combination of properties.

Therefore, it is an object of the invention to provide linear, acid functional polyester resins in which the acid-functionality only comprises tertiary aliphatic carboxylic acid functionality, which can be readily glycidated so as to form a polyglycidylester resin. Such linear, tertiary carboxyl functional polyester resin and such polyglycidylester resin preferably show further improved properties when used in outdoor durable powder coating compositions, which are relatively environmentally friendly.

Accordingly, the invention provides linear, tertiary carboxyl functional polyester resins produced by reacting a) at least one compound $A_1$, comprising the reaction product of
  (i) a glycidylester of a mixture of synthetic highly branched saturated monocarboxylic acids isomers of the formula:

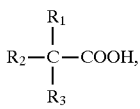

wherein $R_1$, $R_2$ and $R_3$ are alkyl groups of from 1 to 15 carbon atoms, of which at least one is methyl, each acid containing from 5 to 19 and preferably from 5 to 13 carbon atoms, and preferably CARDURA glycidylesters (glycidylesters of versatic acids), and
  (ii) a mixture of said synthetic highly branched saturated monocarboxylic acids (versatic acids), the components (i) and (ii) having a molar ratio of 1:1; said component $A_1$ being optionally mixed with hydroxy pivalic acid ($A_2$) and/or hydrogenated diphenylolpropane ($A_3$);
b) at least one aromatic or cycloaliphatic dicarboxylic acid compound B, comprising two aromatic- or secondary aliphatic carboxyl groups or the anhydride thereof;
c) optionally at least one dihydroxymonocarboxylic acid compound C comprising a tertiary aliphatic carboxyl group and two aliphatic hydroxyl groups, which may each independently be primary or secondary hydroxyl; and
d) optionally at least one diol compound D comprising two aliphatic hydroxyl groups which may each independently be a primary or a secondary hydroxyl group; the molar ratio of compounds $A_1:A_2+A_3:B:C:D$ being $A_1:(2-A_1):X+Y+1:X:Y$, wherein $A_1$ ranges from 0.1 to 2, wherein Y ranges from 0 to 6 and X ranges from 2 to 8, at a temperature of from 100° to 225° C., until essentially all the non-tertiary carboxyl groups as initially present in the reaction mixture have been reacted.

The linear tertiary aliphatic carboxyl functional polyester resin thus produced is essentially free from non-tertiary carboxyl groups when it has an acid value which practically corresponds to the theoretical acid value calculated on the basis of the amount of tertiary carboxyl groups of the reactants as initially present in the reaction mixture. The term "practically" is used herein to indicate a deviation from the theoretical value of +/−5% at most and preferably 3% at most. This is determined by standard alkali metric titration.

For those skilled in the art it will be understood that the molecular weight distribution and number average molecular weight of the resin produced will depend on the specific reactants and the ratios applied in the process of the invention. Whilst the tertiary aliphatic carboxyl groups present in compounds $A_1$, $A_2$, $A_3$ and D practically do not react under the esterification conditions employed, glycidation of these tertiary aliphatic carboxyl groups with epihalohydrin can be performed under standard alkaline conditions whereby a polyglycidylester resin can be obtained which contains a low hydrolizable halogen content, usually lower than 0.5% by weight based on the total weight of the composition.

It will be appreciated that other aspects of the present invention are formed by polyglycidylesters of the hereinbefore specified linear carboxyl functional polyesters and by coating compositions and more in particular powder coating compositions or liquid coatings, comprising said linear, tertiary carboxyl functional polyester resins and/or said polyglycidylesters derived therefrom and by cured products, obtained by using these coating compositions.

The process for preparation of the linear tertiary aliphatic carboxyl functional polyester may in general be carried out according to conventional esterification methods, preferably by azeotropic condensation. In particular, the condensation is carried out by charging the compounds A to D simultaneously to the reactor whereafter the temperature is increased from room temperature to from 180° to 210° C. during a period of 3 to 8 hours, thus allowing the reaction to initiate and to proceed under continuous azeotropic removal of water. Generally the azeotropic removal of water is being continued until a reaction product is obtained which has an acid value which corresponds to the theoretical acid value as referred to above. An esterification catalyst known in the art, such as for example dibutyltinoxide, paratoluenesulphonic acid, tinoctoate, zincoctoate and lithium ricinoleate may be used in the esterification process, but is in general not required.

Suitable compounds $A_1$ for use as constituent of the linear tertiary aliphatic carboxyl functional polyesters of the present invention are compounds derived from VERSATIC acids (VERSATIC is a trademark) containing from 5 to 13 carbon atoms.

It will be appreciated that the two highly branched saturated carboxylic acids (preferably VERSATIC acids) which have been incorporated in the reacted adduct component $A_1$, may be the same or different.

For example, combinations of VERSATIC 10 (acid containing 10 carbon atoms) or VERSATIC 9 (acid containing 9 carbon atoms) acids and of CARDURA 5 (glycidylester of versatic acid containing 5 carbon atoms) can be reacted with each other in a 1:1 molar ratio, or VERSATIC 5 acids can be reacted with CARDURA 5 in a 1:1 molar ratio, or VERSATIC 10 acids can be reacted with CARDURA 10 in a 1:1 molar ratio to provide suitable components $A_1$.

It will be appreciated that if the $A_1$ proportion is about 2, that the final coating compositions derived from the carboxyl functional polyester resin and/or corresponding polyglycidyl resin components derived thereof, wherein the proportion of $A_1$ has said value, shows excellent pigment wetting properties and flow out of the coating during cure.

However, it was also found, that powder coatings, derived from carboxyl functional polyester resin components and/or polyglycidyl resin components, wherein $A_1$ has a proportion of significantly less than 2, desired for reasons of reaching a specific Tg value of the final cured coating, show also improved pigment wetting and flow out.

In order to obtain optimal properties of the powder coating compositions, derived from the hereinbefore specified linear polyesters and/or their corresponding linear polyglycidylesters, at least one of the VERSATIC acids, to be incorporated into component $A_1$, must have a relatively small number of carbon atoms (e.g. 5). In particular a combination of VERSATIC 5 (acid containing 5 carbon atoms) and VERSATIC 10 is preferably incorporated.

More preferably in component $A_1$ both incorporated branched acids have a relatively small number of carbon atoms and most preferably VERSATIC 5 acids are exclusively used.

In order to obtain the liquid coating compositions derived from the linear polyesters or polyglycidylesters as specified hereinbefore components $A_1$ are used derived from relatively high molecular weight VERSATIC acids, preferably VERSATIC 10 acids.

Suitable compounds B for use in the process of the present invention are for example phthalic acid (PA), tetrahydrophthalic acid, hexahydrophthalic acid (HHPA), methyl-hexahydrophthalic acid, endomethylenetetrahydrophthalic acid, methyl endomethylenetetrahydrophthalic acid, 1,4-cyclohexane-dicarboxylic acid and 1,3-cyclohexanedicarboxylic acid or combinations thereof; whereof HHPA is particularly preferred.

A typical example of a suitable compound C for use in the process of the present invention is dimethylolpropionic acid.

Suitable compounds D for use in the process of the present invention include branched aliphatic-, cycloaliphatic-, or aralipathic compounds, containing two aliphatic hydroxyl groups, each individually being either a primary or a secondary hydroxyl group, such as for example propylene glycol, neopentyl glycol, hydrogenated diphenylolpropane (HDPP), hydrogenated 4,4'-dihydroxydiphenyl, 1,4-cyclohexanedimethylol, 1,4-dihydroxycyclohexane, hydroxypivalylhydroxypivalate and 2-butyl-2-ethyl-1,3-propanediol or mixtures thereof; of which HDPP is particularly preferred.

As indicated above the linear tertiary aliphatic carboxyl functional polyester resin obtainable according to the process of the present invention can be easily converted to a polyglycidylester resin according to methods known in the art i.e. by reaction with an excess epihalohydrin in the presence of a suitable base and catalyst. Most conveniently epichlorohydrin is used.

It has surprisingly been found that both the linear tertiary aliphatic carboxyl functional polyester resin and the polyglycidylester resin of the present invention can provide powder coating compositions, which show significantly improved physical properties, which can be tailor made, dependent on the molar ratio between the components $A_1$, $A_2$ and $A_3$ and dependent on the type of each of the VERSATIC residues incorporated in component $A_1$. For example if VERSATIC acid residues in component $A_1$ are sufficiently different (VERSATIC 10 and VERSATIC 5 acids) and a relatively low molar ratio of $A_1/A_2+A_3$ (i.e. relatively large amounts of HPA and/or HDPP), solid resins are obtained as end product.

For the preferred functional polyesters and the glycidylesters thereof, $A_2$ and $A_3$ will be in the range of from 0.1 to 1.

On the other hand the linear polyesters and the corresponding polyglycidylesters derived therefrom can be applied as liquid resins in coatings, when a predominantly amount of so-called soft blocks formed by diacid (component b) and a dihydroxymonocarboxylic acid (component c) are present and less combinations of diols (component a) and diacid (component b). Moreover the liquid character can be further pronounced if all VERSATIC acid constituents contain a high number of carbon atoms only (e.g. VERSATIC 10 or VERSATIC 9 acids, of which VERSATIC 10 acids are preferred).

It will be appreciated that due to the polymeric nature of the polyglycidylester resin of the present invention a relatively low level of toxicity can now be combined with excellent coating properties. More in particular an excellent weatherability and acid resistance in combination with an attractive film flow, giving a coherent and smooth appearance, have been reached.

It was found that those polyglycidylester resins derived from the linear tertiary aliphatic carboxyl functional polyester resins of the invention containing $A_1$ in a range from 0.1 to 0.25 whilst X ranges from 2 to 4 and Y simultaneously ranges from 1 to 4, can provide the most preferred outdoor durable powder coating compositions.

On the other hand it was found that liquid resins at room temperature could be obtained, when Y ranges from 0 to 2 and/or $A_1$ is containing $C_{10}$ acids or higher.

The curable powder coating compositions of the invention may be prepared by addition of a cross-linking resin to either the hereinbefore specified linear tertiary aliphatic carboxyl functional polyester resins of the present invention or to the polyglycidylester resin obtainable by glycidating said linear tertiary aliphatic carboxyl functional polyester resin.

The amount of cross-linking compound used in the powder coating compositions of the invention will normally be such so as to provide about equal amounts of reactive groups of the cross-linking compound and of the tertiary aliphatic carboxyl groups present in the linear tertiary aliphatic carboxyl functional polyester resin or of the epoxy groups present in the polyglycidylester resin.

The liquid coating compositions of the present invention may be prepared by addition of a liquid cross-linking resin to either the liquid linear tertiary aliphatic carboxyl functional polyester resins or the liquid polyglycidylester resin, obtainable by glycidating said linear tertiary aliphatic carboxyl functional polyester resin.

It will be appreciated that said liquid coating compositions can be successfully applied by immersion, spraying or brushing or roller coating.

Suitable cross-linking resins for use in combination with the linear tertiary aliphatic carboxyl functional polyester resins of the present invention are for example outdoor durable epoxy resins, such as for example the polyglycidylester resins according to the present invention, the diglycidylesters of alpha, alpha'-dibranched dicarboxylic acids as disclosed in European Patent Application publication number 518,408 and the polyglycidylesters based on polycarboxylic acids carrying two alkyl substituents on each of the alpha carbon atoms as disclosed in European patent application publication number 366,205.

Suitable cross-linking resins for use in combination with the polyglycidylester resins of the present invention are for example the (corresponding) acid functional polyester resin of the present invention; solid polyacids such as sebacic acid, 1,12-dodecanedioic acid; anhydrides such as polyazeleic polyanhydride; acid functional polyesters such as the reaction product of one mole of trimethylolpropane and 3 moles of hexahydrophthalic anhydride, the reaction product of 1,6-hexanediol with a molar excess of 1,12-dodecanedioic acid, the reaction product of 4 moles 1,10-decanedicarboxylic acid, 1.49 mols hexanediol, 0.47 mols 1,1,1-tris-(hydroxymethyl)-propane and 0.27 mols pentaerythritol, the reaction product of 4 mols 1,10-decanedicarboxylic acid, 1.2 mols hexanediol, 0.45 mols trimethylolpropane, 0.29 mols pentaerythritol and 0.21 mols dimethylolpropionic acid and the reaction product of one mole of hexamethoxymethylmelamine and 3 moles of hydroxypivalic acid and amine-type curing agents.

Most preferred are combinations of the linear tertiary aliphatic carboxyl functional polyester resins and the polyglycidylesters derived therefrom.

The powder coating compositions of the present invention may further comprise a catalyst and optionally other additives, as known in the art to be suitable for use in powder coating compositions.

Suitable catalysts are for example quaternary ammonium and phosphonium salts; metal salts/compounds such as for example stannous(II)octoate; basic compounds such as for example the imidazoles; and tertiary amines such as for example diazabicyclo/undecene.

The amount of catalyst used will usually be somewhere in the range of from 0.1 to 2% by weight based on the weight of the total powder coating composition.

Suitable cure times and cure temperatures of the powder coating compositions of the invention are those conventionally applied in connection with powder coating systems.

The invention is illustrated by the following examples, however without restricting its scope to these specific embodiments.

EXAMPLE 1

Preparation of linear tertiary aliphatic carboxyl functional polyesters 1 to 4 according to the invention and two comparative prior art polyesters (a and b).

Compounds (a) to (f) were charged in molar amounts as indicated in table 1 in a roundbottom glass reactor, equipped with Dean & Stark Trap with reflux condenser, temperature control, nitrogen inlet and stirrer.

The mixture was then heated to 150° C. in 30 minutes and xylene was added (5% weight on the total weight of the reaction mixture). The temperature of the reaction mixture was increased in two hours to 210° C. and kept at 210° C. until the theoretical acid value as referred to above was reached. The acid functional polyester thus formed was discharged and allowed to cool down to room temperature.

TABLE 1[*]

| comp. | Polyester resin | 1 | 2 | 3 | 4 | 5 | a | b |
|---|---|---|---|---|---|---|---|---|
| (a) | V-EPHV ($A_1$) | 0.1 | 0.25 | 0.25 | 2 | 0.1 | — | — |
| (b) | HPA ($A_2$) | — | — | 1.75 | — | 1.9 | 2 | — |
| (c) | HDPP ($A_3$) | 1.9 | 1.75 | — | — | — | — | 2 |
| (d) | HHPA | 5 | 7 | 9 | 7 | 5 | 9 | 8 |
| (e) | DMPA | 3 | 4 | 2 | 6 | 3 | 2 | 4 |
| (f) | HDPP | 1 | 2 | 6 | 0 | 1 | 6 | 3 |

[*]Numbers given represent the amount of moles of a particular compound charged to the reactor in the process of example 1 for the preparation of the linear tertiary carboxyl functional polyester resins 1 to 4, a and b.

The chemical compounds represented by the abbreviations used are:

V-EPHV: reaction product of one mole VERSATIC acid and 1 mol glycidylester of VERSATIC acids (CARDURA)

HPA: hydroxypivalic acid

HHPA: hexahydrophthalic anhydride

DMPA: dimethylolpropionic acid

HDPP: hydrogenated diphenylolpropane

The molecular structures (a) and (b) of the functional polyester resins obtained according to the discussed prior art are:

a) HPA-(HHPA-DMPA)$_2$-HHPA-(HDPP-HHPA)$_6$-HPA

This reaction product is a representative of resins obtained according to EP-A-0634434.

b) HDPP-(HHPA-DMPA)$_4$-(HHPA-HDPP)$_4$

This reaction product is a representative of resins obtained according to EP-A-0720997.

EXAMPLE 2

Preparation of polyglycidylester resins I to V.

An amount equalling 1 carboxyl group equivalent of a linear tertiary aliphatic carboxyl functional polyester resins 1 to 4, a and b, as prepared in example 1 was dissolved in 8 moles epichlorohydrin (ECH) and isopropylalcohol (IPA). The solution was charged to a 3 liter glass-reactor equipped with a temperature control, stirrer and reflux condensor. Next the temperature was raised to 70° C., followed by the gradual addition of an aqueous solution of 1.2 moles NaOH over a period of time of 60 minutes. After an additional reaction period of 10 minutes the reactor content was allowed to settle and the aqueous phase was separated from the organic phase.

The organic phase was vacuum flashed to remove water, IPA and ECH.

The resulting product was dissolved in toluene and the organic phase was washed three times with water whereafter the organic phase was vacuum flashed to remove toluene. The glycidylester thus obtained was discharged and allowed to cool down. Characteristics of the solid and liquid polyglycidylester resins prepared are presented in table 2.

TABLE 2

| Acid polyester[1] | 1 | 2 | 3 | 4 | 5 | comparative a[2] | b[2] |
|---|---|---|---|---|---|---|---|
| Acid value precursor | 1.60 | 1.78 | 1.16 | 2.52 | 3.18 | 1.28 | 1.20 |

Glycidylester I to IV and A and B[3]

|  | I | II | III | IV | A | B |
|---|---|---|---|---|---|---|
| EGC mmol/kg | 1120 | 1330 | 950 | 1750 | 1000 | 980 |
| Softening range[4] | 85–90 | 70–80 | 85–90 | <50 semi-solid | 90–95 | 90–95 |

[1]As prepared in Example 1.
[2]Comparative glycidylesters.
[3]As prepared in Example 2.
[4]The softening range was determined by using a Kofler Bench.

Powder coating compositions A according to the invention and D and E representing comparative compositions.

All ingredients as indicated in Table 3 were mixed at room temperature, then melt-blended on a Buss single screw extruder at 110° C. The extrudate was chilled, flaked, ground in a micromill and classified through 106 micrometer mesh. The powder was electrostatically sprayed onto chromate pretreated, 2 mm thick aluminium panels. The coated panels were baked at 200° C. for 15 minutes. The resultant coatings (thickness 40–60 micrometers) were very smooth, hard, glossy and exhibited good mechanical properties and good weathering resistance.

TABLE 3

|  |  | A | B | C | D | E |
|---|---|---|---|---|---|---|
| Glycidylester (see Table 2) | I | 583 | — | — | — | — |
|  | II | — | 556 | — | — | — |
|  | III | — | — | 607 | — | — |
|  | A | — | — | — | 600 | — |
|  | B | — | — | — | — | 602 |
| Polyester No. 5 |  | 205 | 232 | 181 | 188 | 186 |
| Titaniumdioxide |  | 167 | 167 | 167 | 167 | 167 |
| Modaflow | 10.1 | 10.1 | 10.1 | 10.1 | 10.1 | 10.1 |
| Benzoin |  | 6.8 | 6.8 | 6.8 | 6.8 | 6.8 |
| Coating composition | A | B | C | D a | E b | F = IV +Polyester No. 5 |
| Coating properties |  |  |  |  |  |  |
| Flow-out* | 4 | 5 | 4 | 3 | 2 | 5 |
| Appearance visual |  |  |  |  |  |  |
| Accelerated weather resistance** | 2300 | 2600 | 3500 | 3100 | 2200 | 3500 |

It will be appreciated that D and E are to be regarded as comparative compositions and the properties of composition C have to be compared with composition D, whereas the properties of compositions A and B are to be compared with those of E.

\* Rating 5=excellent appearance; very smooth and coherent.

3=moderate to good appearance; some orange peel.

1=very bad rough appearance.

\*\* Hours in Atlas Weather-O-meter, running SAE-J 1960 test method before 50% reduction in gloss.

We claim:

1. Linear, tertiary carboxyl functional polyester resins produced by reacting
   a) at least one compound $A_1$, comprising the reaction product of
      (i) a glycidylester of a mixture of highly branched saturated monocarboxylic acids isomers of the formula:

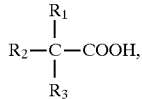

wherein $R_1$, $R_2$ and $R_3$ are alkyl groups of from 1 to 15 carbon atoms, of which at least one is methyl, each acid containing from 5 to 19, and
      (ii) a mixture of said highly branched saturated monocarboxylic acids, the components (i) and (ii) having a molar ratio of 1:1; said component $A_1$ being optionally mixed with hydroxy pivalic acid ($A_2$) and/or hydrogenated diphenylolpropane ($A_3$);
   b) at least one aromatic or cycloaliphatic dicarboxylic acid compound B, comprising two aromatic- or secondary aliphatic carboxyl groups or the anhydride thereof;
   c) optionally at least one dihydroxymonocarboxylic acid compound C comprising a tertiary aliphatic carboxyl group and two aliphatic hydroxyl groups, which may each independently be primary or secondary hydroxyl; and
   d) optionally at least one diol compound D comprising two aliphatic hydroxyl groups which may each independently be a primary or a secondary hydroxyl group;
the molar ratio of compounds $A_1:A_2+A_3:B:C:D$ being $A_1:(2-A_1):X+Y+1:X:Y$, wherein $A_1$ ranges from 0.1 to 2, wherein Y ranges from 0 to 6 and X ranges from 2 to 8, at a temperature of from 100° to 225° C., until essentially all the non-tertiary carboxyl groups as initially present in the reaction mixture have been reacted.

2. The linear, tertiary carboxyl functional polyester resin of claim 1 in which $A_1$ represents a reaction product of a glycidylester of highly branched saturated monocarboxylic acids comprising acids containing 10 carbon atoms and highly branched saturated monocarboxylic acids comprising acids containing 5 carbon atoms.

3. The linear, tertiary carboxyl functional polyester resin of claim 1 in which $A_1$ represents a reaction product of a glycidylester of highly branched saturated monocarboxylic acids comprising acids containing 5 carbon atoms and highly branched, saturated monocarboxylic acids comprising acids containing 5 carbon atoms.

4. The linear, tertiary carboxyl functional polyester resin of claim 1 in which $A_1$ represents a reaction product of a glycidylester of highly branched saturated monocarboxylic acids comprising acids containing 10 carbon atoms and highly branched, saturated monocarboxylic acids comprising acids containing 10 carbon atoms.

5. A polyglycidylester resin produced by reacting a linear, tertiary carboxyl functional polyester resin of claim 1 with epihalohydrin in the presence of a suitable base.

6. A powder coating composition comprising a linear tertiary aliphatic carboxyl functional polyester resin of claim 1 and a cross-linking agent.

7. A powder coating composition comprising a polyglycidylester resin of claim 5 and a cross-linking agent.

8. A liquid coating composition comprising a linear tertiary aliphatic carboxyl functional polyester resin of claim 1 and a cross-linking agent.

9. A liquid coating composition, comprising a polyglycidylester resin of claim 5 and a cross-linking agent.

10. A product coated with a coating composition according to claim 6.

11. A product coated with or coating composition according to claim 7.

12. A cured product of claim 6.

13. A cured product of claim 7.

14. The linear, tertiary carboxyl functional polyester resin in which each acid in $A_1$ contains from 5 to 13 carbon atoms.

* * * * *